US009925605B2

(12) United States Patent
Wang (10) Patent No.: US 9,925,605 B2
(45) Date of Patent: Mar. 27, 2018

(54) ASSEMBLY OF SAW HANDLE AND SAW MEMBER

(71) Applicant: Kuang Pin Wang, Taichung (TW)

(72) Inventor: Kuang Pin Wang, Taichung (TW)

( * ) Notice: Subject to any disclaimer, the term of this patent is extended or adjusted under 35 U.S.C. 154(b) by 394 days.

(21) Appl. No.: 14/863,613

(22) Filed: Sep. 24, 2015

(65) Prior Publication Data

US 2017/0087648 A1    Mar. 30, 2017

(51) Int. Cl.
*B23D 49/10* (2006.01)
*B23D 49/12* (2006.01)
*B23D 49/14* (2006.01)
*B23D 51/01* (2006.01)
*B23D 51/10* (2006.01)
*B27B 21/04* (2006.01)
*B23D 61/12* (2006.01)
*B25G 3/18* (2006.01)

(52) U.S. Cl.
CPC ............ *B23D 51/10* (2013.01); *B23D 49/10* (2013.01); *B23D 49/12* (2013.01); *B23D 49/14* (2013.01); *B23D 51/01* (2013.01); *B23D 61/123* (2013.01); *B25G 3/18* (2013.01); *B27B 21/04* (2013.01)

(58) Field of Classification Search
CPC ........ B23D 49/10; B23D 49/11; B23D 49/12; B23D 49/14; B23D 51/01; B23D 51/10; B23D 61/123; B23D 61/128; B25G 3/18; B27B 21/02; B27B 21/04
USPC ....... 30/166.3, 329–331, 337–340, 342, 517, 30/525
See application file for complete search history.

(56) References Cited

U.S. PATENT DOCUMENTS

| | | | | |
|---|---|---|---|---|
| 508,798 A | * | 11/1893 | Andrews ............... | B23D 51/01 30/525 |
| 2,321,223 A | * | 6/1943 | Loughlin ............... | B23D 51/01 30/525 |
| 2,747,631 A | * | 5/1956 | Behlefeldt ............. | B23D 49/12 30/519 |
| 2,755,556 A | * | 7/1956 | Lindenbein ............ | B23D 51/01 30/144 |
| 4,466,471 A | * | 8/1984 | Thomson ............. | B23D 51/125 30/517 |
| 5,722,168 A | * | 3/1998 | Huang ................... | B23D 51/01 30/160 |
| 5,979,065 A | * | 11/1999 | Hsu ........................ | B23D 51/01 30/161 |
| 7,257,900 B2 | * | 8/2007 | Wheeler et al. ....... | B23D 51/10 279/77 |

(Continued)

*Primary Examiner* — Clark F Dexter
(74) *Attorney, Agent, or Firm* — Rosenberg, Klein & Lee (57) ABSTRACT

An assembly of saw handle and saw member is provided. An end portion of the saw member is inserted into an inserting groove of the saw handle. The saw handle has stopping bars at an inserting portion and a swing arm. The end portion defines an opened hole and a closed hole. When the swing arm is moved to an eject position and not received in a receiving space of a guard portion of the saw handle, the saw member is not blocked by the swing arm and is allowed to be inserted into the inserting groove. After the saw member is inserted into the inserting groove and the swing arm is moved to a fix position, the stopping bars are respectively located in the opened hole and the closed hole, so that the saw member can be assembled with the saw handle in a convenient and rapid manner.

7 Claims, 12 Drawing Sheets

(56) References Cited

U.S. PATENT DOCUMENTS

| | | | | |
|---|---|---|---|---|
| 7,325,314 B1* | 2/2008 | Chen | ................ | B23D 51/10 30/166.3 |
| 8,312,632 B2* | 11/2012 | Rowlay et al. | ........ | B23D 51/10 30/329 |
| 2007/0028465 A1* | 2/2007 | Chen | ................ | B27B 21/02 30/506 |
| 2010/0018065 A1* | 1/2010 | Janssson et al. | ....... | B23D 51/10 30/517 |
| 2010/0031512 A1* | 2/2010 | Rowlay et al. | ........ | B23D 51/10 30/161 |

* cited by examiner

ASSEMBLY OF SAW HANDLE AND SAW MEMBER

BACKGROUND OF THE INVENTION

Field of the Invention

The present invention relates to a saw, and more particularly to an assembly of saw handle and saw member.

Description of the Prior Art

Figure 12:
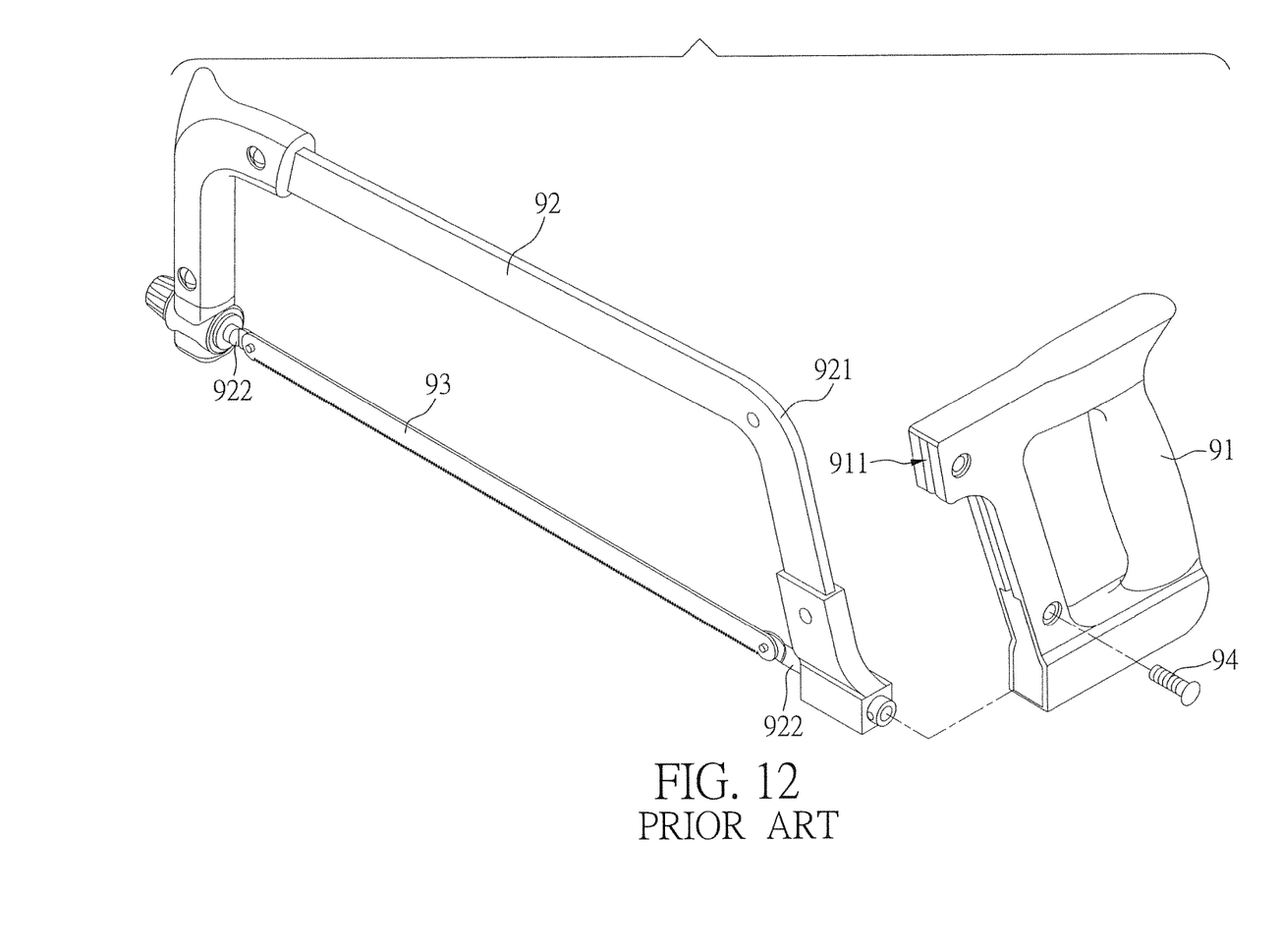
FIG. 12 illustrates a sectional view of a conventional saw.

FIG. 12 illustrates a sectional view of a conventional saw. The saw includes a saw handle 91, a fastening bracket 92, and a saw member 93. An inserting groove 911 is laterally opened on the saw handle 91, the fastening bracket 92 has an end portion 921 corresponding to the inserting groove 911, and the fastening bracket 92 further has assembling portions 922 for fixing the saw member 93. In assembling, firstly the saw member 93 is assembled with the assembling portions 922 of the fastening bracket 92, and then the end portion 921 of the fastening bracket 92 is inserted into the inserting groove 911, next the fastening bracket 92 and the saw handle 91 are fastened with each other by a screw 94, so that the saw can be assembled for further use.

However, the fastening bracket 92 is assembled with the saw member 93 followed by inserting the end portion 921 of the fastening bracket 92 into the inserting groove 911 of the saw handle 91 and fastening the assembled structure with screws 94. The assembling of the conventional saw is complicated, resulting in inconvenience for the user.

The present invention is, therefore, arisen to obviate or at least mitigate the above mentioned disadvantages.

SUMMARY OF THE INVENTION

One object of the present invention is to provide an assembly of saw handle and saw member, in which the saw member can be replaced conveniently and quickly.

To achieve the above and other objects, an assembly of saw handle and saw member is provided and comprises a saw handle and a saw member. The saw handle has a handle portion and a guard portion spaced from the handle portion. A swing arm is pivoted on the saw handle. The swing arm and the guard portion are located at the same side of the saw handle. The guard portion is hollowed to define a receiving space for receiving the swing arm when the swing arm is swung to the receiving space in a lateral direction. The saw handle has an inserting portion. The inserting portion has an inserting groove. The inserting groove and the receiving space are located at the same side of the saw handle. The inserting groove communicates with the receiving space. At least one first stopping bar is passing through the inserting groove of the inserting portion. At least one second stopping bar is assembled on the swing arm, and the second stopping bar is received in the receiving space along with the swing arm. A fixing device is assembled to the saw handle to position the swing arm in the receiving space. The saw member has an end portion adapted to be inserted into the inserting groove. The end portion defines an opened hole and a closed hole, the opened hole is defined at the edge of the saw member so as to be the opening for disposing the first stopping bar. A stopping portion is formed in the opened hole. The position of the closed hole corresponds to the position of the second stopping bar. The second stopping bar is movable between an eject position and a fix position when the swing arm is not received in the receiving space. When the second stopping bar is moved to the eject position, the saw member is not blocked by the second stopping bar and is allowed to be inserted into the inserting groove, and the first stopping bar is stopped by the stopping portion in the opened hole after the saw member is inserted into the inserting groove. When the second stopping bar is moved to the fix position and the swing arm is received in the receiving space and fixed by the fixing device, the second stopping bar is passed through the closed hole and abutted against the inner periphery of the closed hole so as to assemble the saw handle with the saw member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 7, illustrating an assembly of saw handle and saw member according to a first embodiment of the present invention. The embodiments are provided for illustrative purposes, and the claimed scope of the present invention is not limited thereto.

Figure 1:
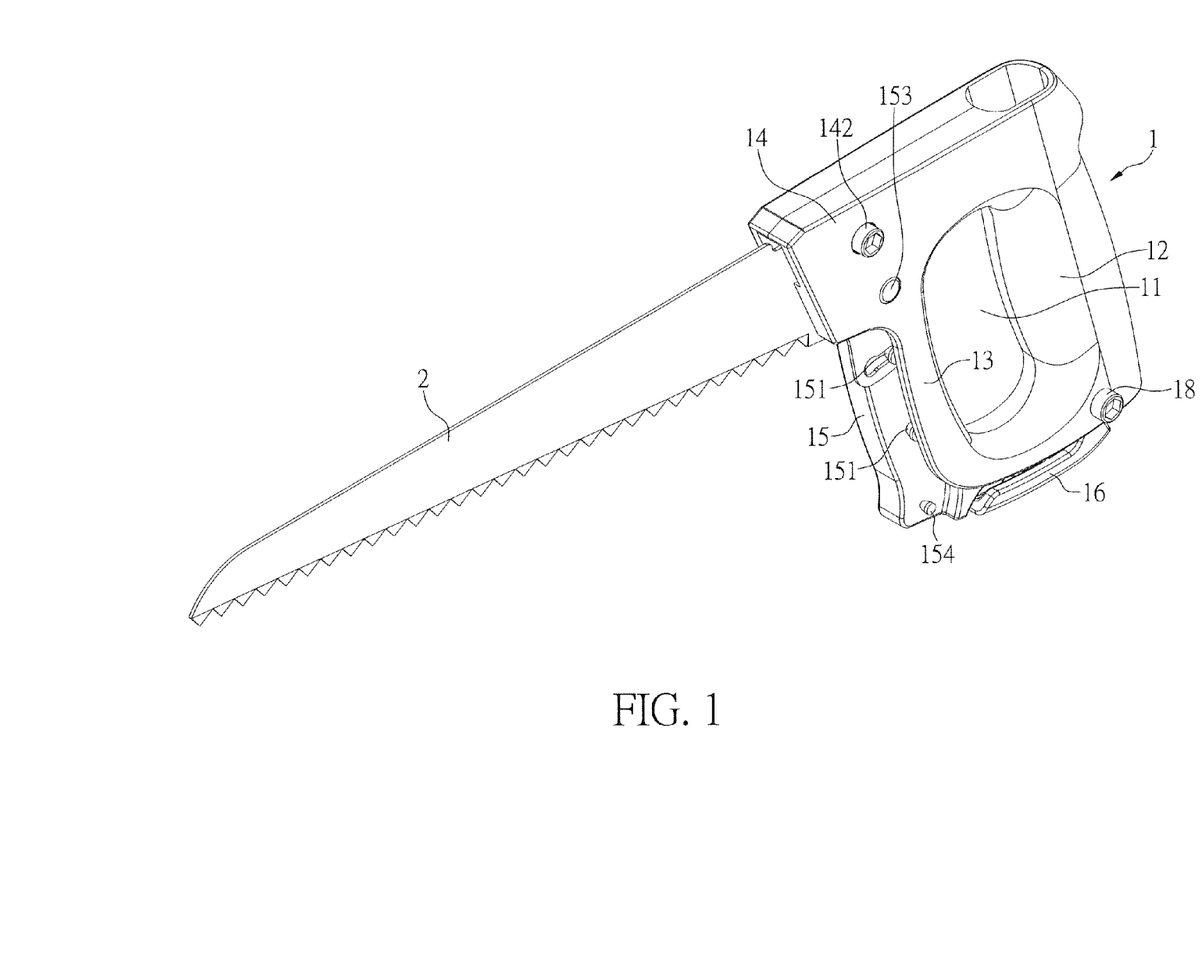
FIG. 1 illustrates a perspective view of an assembly of a saw handle and a saw member according to a first embodiment of the present invention.
Figure 2:
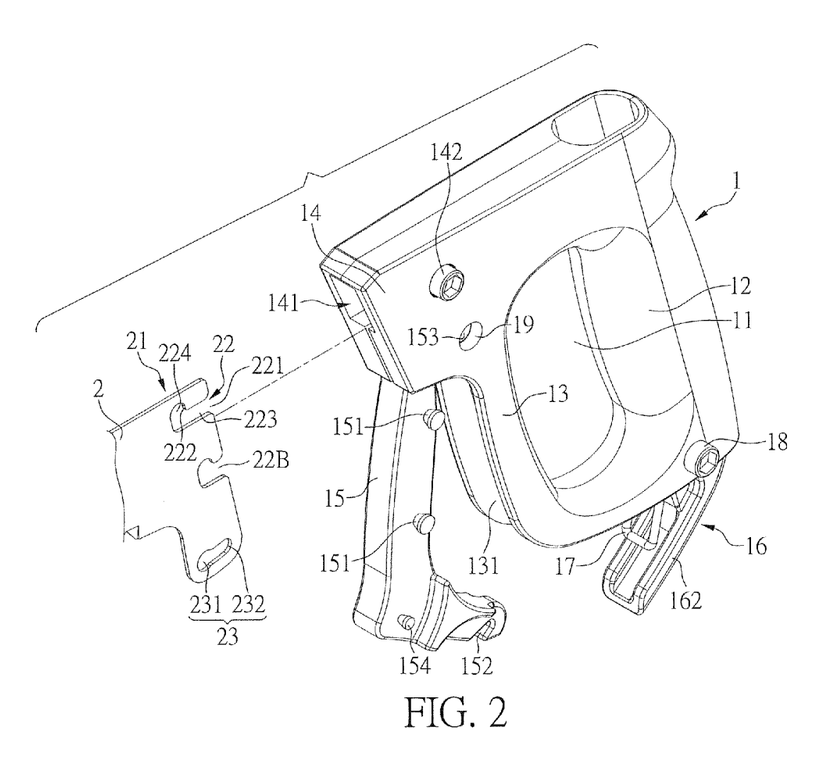
FIG. 2 illustrates a partial exploded view of the assembly of the first embodiment.

As shown in FIGS. 1 to 2, an assembly of saw handle and saw member comprises a saw handle 1 and a saw member 2. Specifically, as shown in FIGS. 1 and 2, the saw handle 1 has an elongate handle hole 11. A handle portion 12 and a guard portion 13 are respectively defined at two sides of the handle hole 11 along the width direction of the handle hole 11, and the guard portion 13 is spaced from the handle portion 12. An inserting portion 14 and a fixing device are respectively disposed at two ends of the saw handle 1 along the length direction of the handle hole 11. A swing arm 15 is pivoted on the saw handle 1, and the swing arm 15 and the guard portion 13 are located at the same side of the saw handle 1. The inserting portion 14 defines an inserting groove 141 laterally. The guard portion 13 is hollowed to define a receiving space 131 for receiving the swing arm 15 when the swing arm 15 is swung to the receiving space 131 in a lateral direction. The inserting groove 141 and the receiving space 131 are located at the same side of the saw handle 1, and the inserting groove 141 communicates with the receiving space 131. The fixing device is provided to position and fix the swing arm 15 in the receiving space 131. In this embodiment, the inserting portion 14 has a first stopping bar 142 passing through the inserting groove 141, and a second stopping bar 151 is assembled on the swing arm 15. The second stopping bar 151 is received in the receiving space 131 along with the swing arm 15.

In this embodiment, the saw member 2 is a knife saw, which is elongated and has an end portion 21 adapted to be inserted into the inserting groove 141. The end portion 21 defines an opened hole 22 and a closed hole 23. The opened hole 22 is defined at the edge of the saw member 2 so as to be an opening 221 for disposing the first stopping bar 142. A stopping portion 222 is formed in the opened hole 22. The position of the closed hole 23 corresponds to the position of the second stopping bar 151. In this embodiment, the closed hole 23 has a large sized hole portion 231 and a small sized hole portion 232 communicating with each other laterally. The second stopping bar 151 has a body portion 1511 and a terminal portion 1512, the outer diameter of the terminal portion 1512 is greater than the diameter of the small sized hole portion 232 but less than the diameter of the large sized hole portion 231, and the outer diameter of the body portion 1511 is less than the small sized hole portion 232.

As shown in FIG. 2, in this embodiment, the opened hole 22 is L shaped and comprises a linear section 223 and a bent section 224. The length direction of the linear section 223 is aligned with the inserting direction along which the saw member 2 is inserted into the inserting groove 141. The length direction of the bent section 224 is tilted from the inserting direction along which the saw member 2 is inserted into the inserting groove 141. The stopping portion 222 is formed at the corner between the linear section 223 and the bent section 224.

Figure 3:
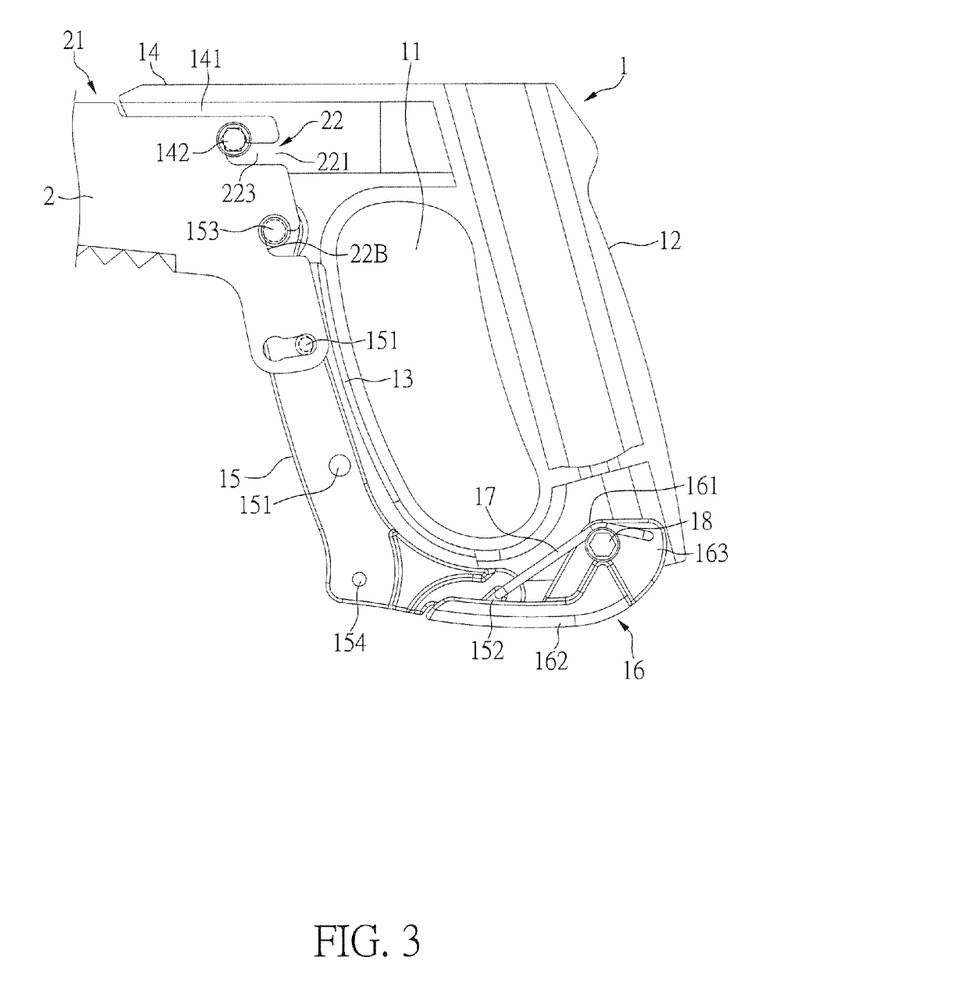
FIG. 3 illustrates a partial sectional view of the assembly of the first embodiment.

As shown in FIGS. 2 and 3, in this embodiment, the fixing device includes a controlling member 16 and a buckling member 17. The controlling member 16 has a pivoting portion 161 assembled at the bottom of the handle portion 12, and the pivoting portion 161 is pivoted with the saw handle 1 by a shaft bar 18. The controlling member 16 has a tab portion 162 exposed from the bottom of the saw handle 1. The buckling member 17 is pivoted with an eccentric portion 163 located near to the pivoting portion 161, and the swing arm 15 has a hook portion 152 corresponding to the buckling member 17.

Figure 4:
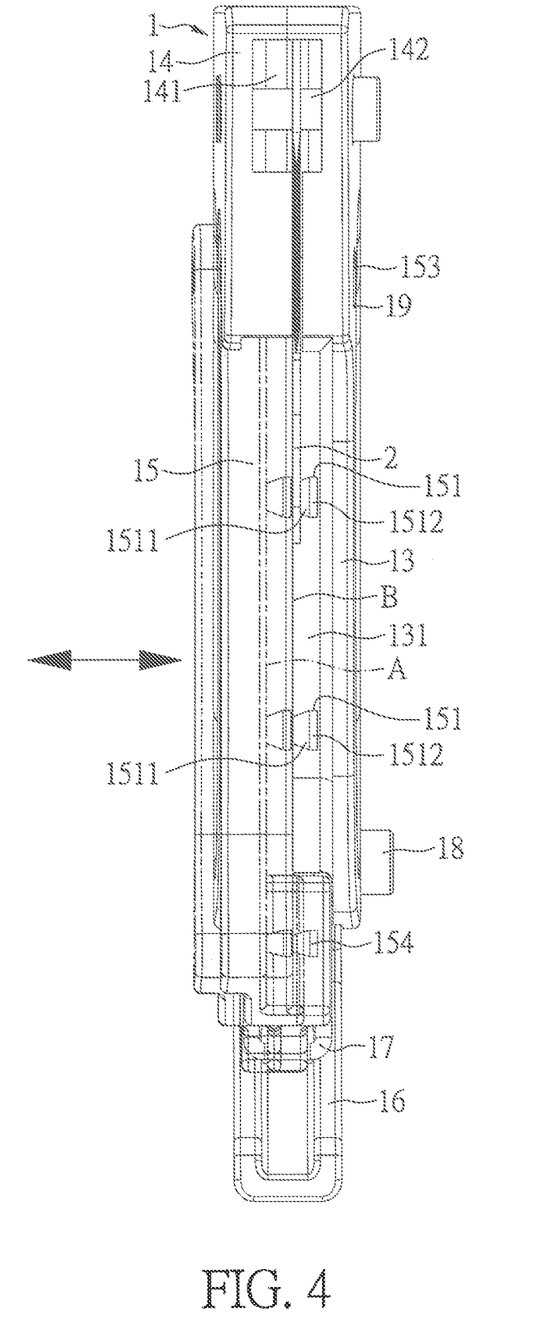
FIG. 4 illustrates a side sectional view of the assembly of the first embodiment.
Figure 5:
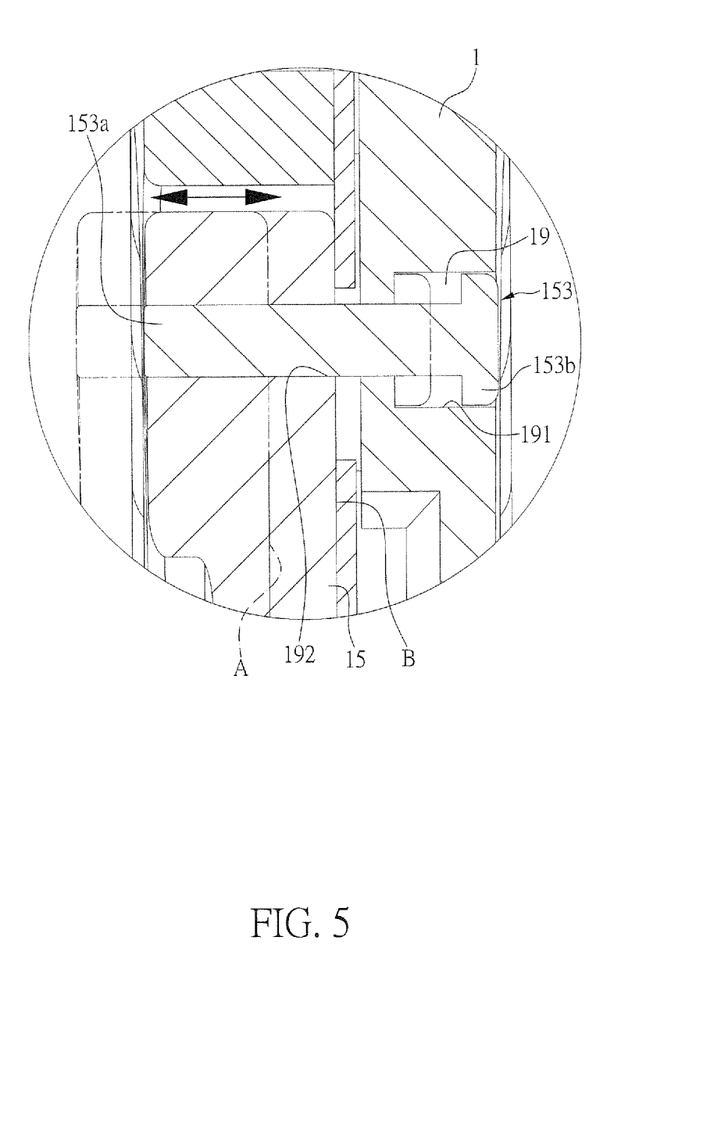
FIG. 5 illustrates a schematic partial enlarged view showing a swing arm of the assembly in operation.

As shown in FIGS. 4 and 5, in this embodiment, the saw handle 1 has a shaft hole 19 defined on the inserting portion 14, and the shaft hole 19 is near to the guard portion 13 and comprises a large sized hole portion 191 and a small sized hole portion 192. The small sized hole portion 192 is located at the inner position with respect to the large sized hole portion 191 and communicates with the inserting groove 141 laterally. One end of the swing arm 15 is pivoted in the shaft hole 19 by a shaft bar 153. The shaft bar 153 has a small sized portion 153a passing through the small sized hole portion 192 and a large sized portion 153b received in the large sized hole portion 191. The swing arm 15 is pivoted on the saw handle 1 by the diameter difference between the large sized portion 153b of the shaft bar 153 and the small sized hole portion 192, so that the second stopping bar 151 is movable between an eject position A and a fix position B when the swing arm 15 is not received in the receiving space 131.

The saw handle 1 has a hollowed portion opposite to the shaft bar 153, and the depth of the large sized hole portion 191 is greater than the length of the large sized portion 153b. When the swing arm 15 is not received in the receiving space 131, the second stopping bar 151 is adapted to be moved to the eject position A; while when the swing arm 15 is received in the receiving space 131, the second stopping bar 151 is adapted to be moved to the fix position B, and the swing arm 15 is blocked by a lateral wall of the receiving space 131 so that the swing arm 15 is limited in the receiving space 131.

Figure 6:
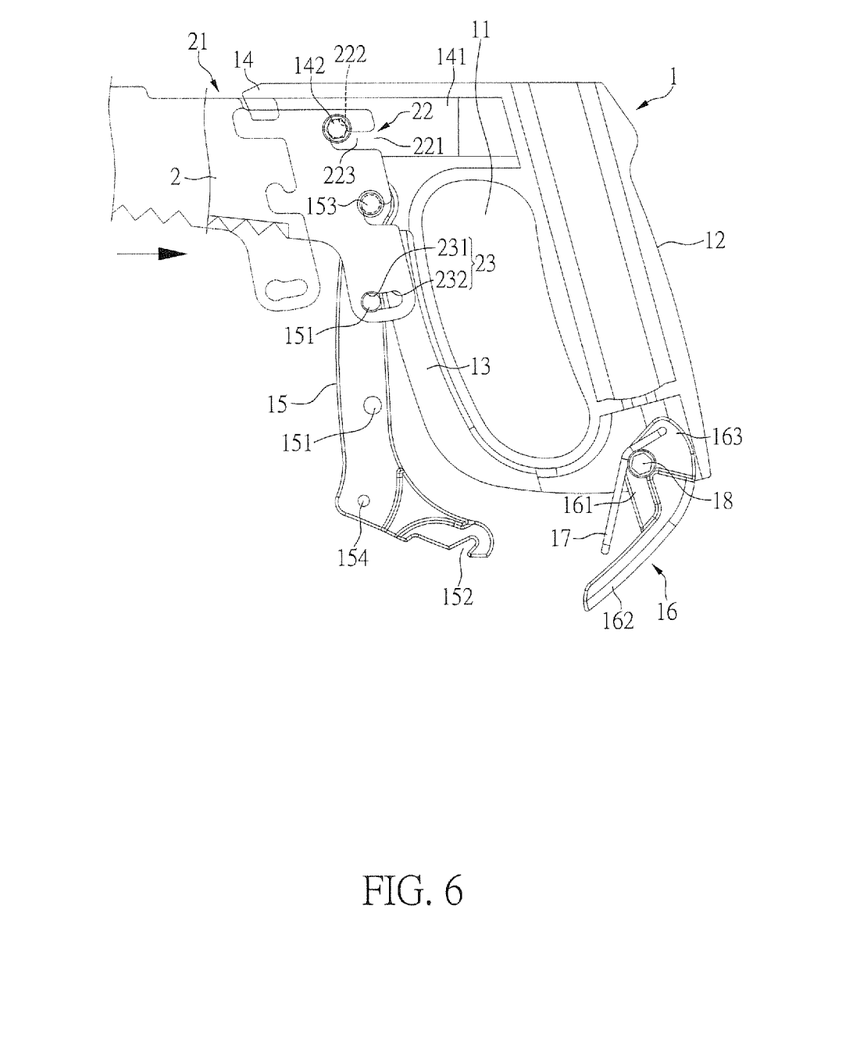
FIG. 6 illustrates a schematic view showing the swing arm is out of the receiving space and yet positioned by the fixing device, of the assembly of the first embodiment.
Figure 7:
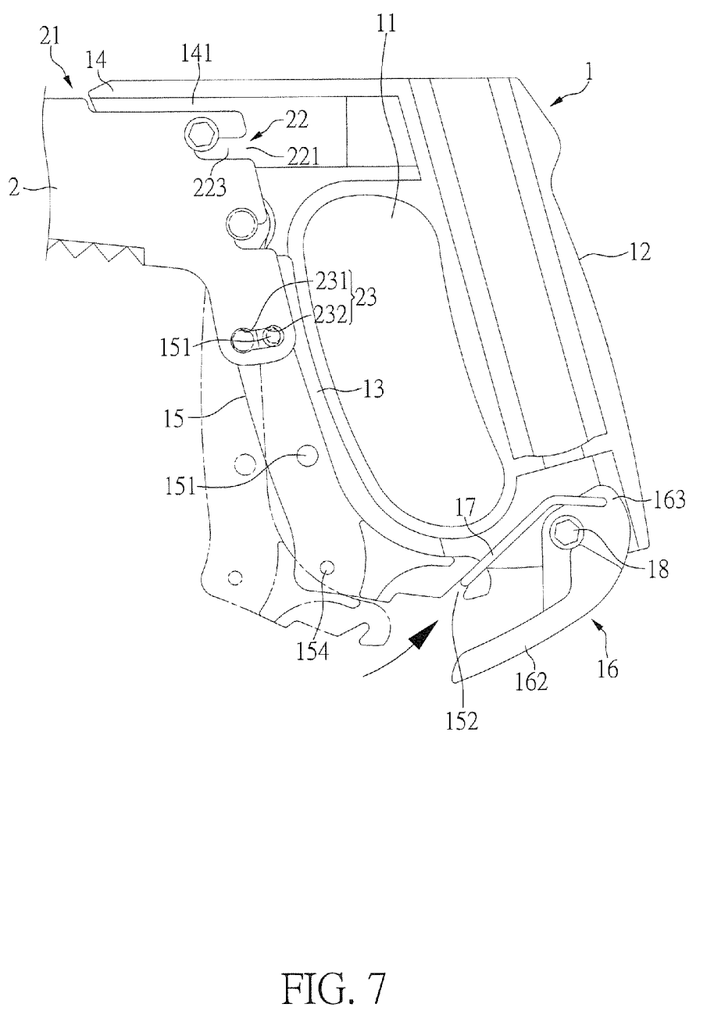
FIG. 7 illustrates a schematic view showing the operation of the fixing device of the assembly of the first embodiment.

In this embodiment, when the swing arm 15 is received in the receiving space 131, the swing arm 15 is positioned by the fixing device. As shown in FIGS. 6 and 7, specifically, firstly the tab portion 162 is pulled and the buckling portion 17 is buckled with the hook portion 152, and then the tab portion 162 is moved back, such that the eccentric portion 163 is pivoted with respect to the shaft bar 18 and drives the buckling member 17 to pivot away from the hook portion 152, thereby the buckling member 17 engaging with the hook portion 152 to position the swing arm 15 in the receiving space 131. Conversely, to detach the buckling portion 17 from the hook portion 152, the tab portion 162 is pulled, so that the eccentric portion 163 drives the buckling member 17 to pivotally rotate toward the hook portion 152. Accordingly, the buckling member 17 can be detached from the hook portion 152, and the swing arm 15 can be swung out of the receiving space 131.

When a user tends to assemble the saw member 2 with the saw handle 1, as shown in FIG. 6, firstly the swing arm 15 is taken from the receiving space 131, and then, the swing arm 15 is moved to the eject position A (as shown in FIG. 4). Under this arrangement, the saw member 2 is not blocked by the second stopping bar 151, so that the saw member 2 can be inserted into the inserting groove 141. After the saw handle 1 is inserted into the inserting groove 141, the first stopping bar 142 is moved from the linear section 223 to the bent section 224 and blocked by the stopping portion 222 of the opened hole portion 22. Next, the second stopping bar 151 is moved to the fix position B to be inserted into the closed hole 23. And then, the second stopping bar 151 is pivotally moved into the receiving space 131 along with the swing arm 15 and positioned by the fixing device, so that the second stopping bar 151 is abutted against the inner periphery of the small sized hole 232 of the closed hole 23 (as shown in FIG. 7). Accordingly, the saw handle 1 is assembled with the saw member 2.

In this embodiment, the saw member 2 has a second opened hole 22B defined at the end portion 21 thereof, and the second opened hole 22B corresponds to the shaft bar 153 located on the inserting portion 14. In other words, in this embodiment, the shaft bar 153 is regarded as another second stopping bar, and the shaft bar 153 is inserted into the second opened hole 22B when the saw member 2 is inserted into the inserting groove 141 of the saw handle 1.

Figure 8:
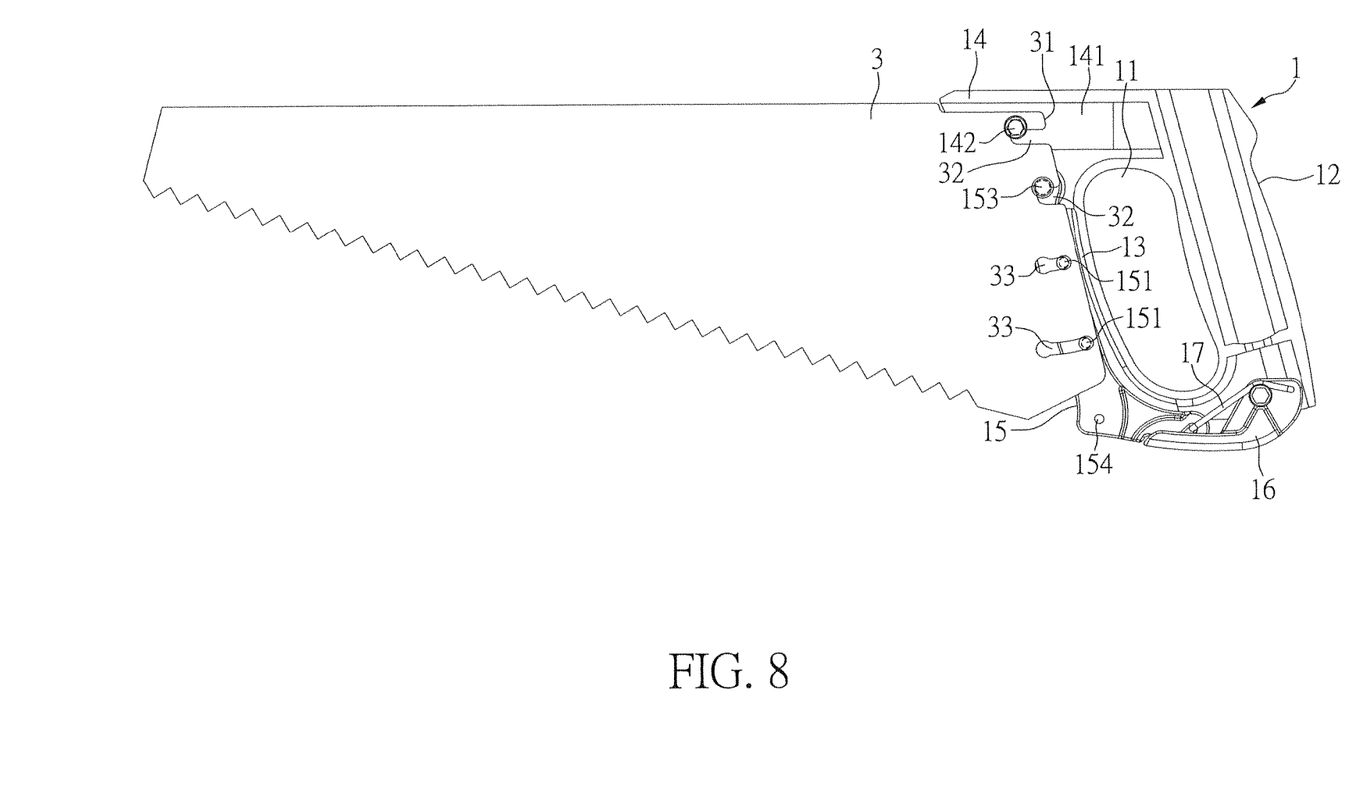
FIG. 8 illustrates a schematic view showing the assembly to be assembled with another embodiment of a saw member.
Figure 9:
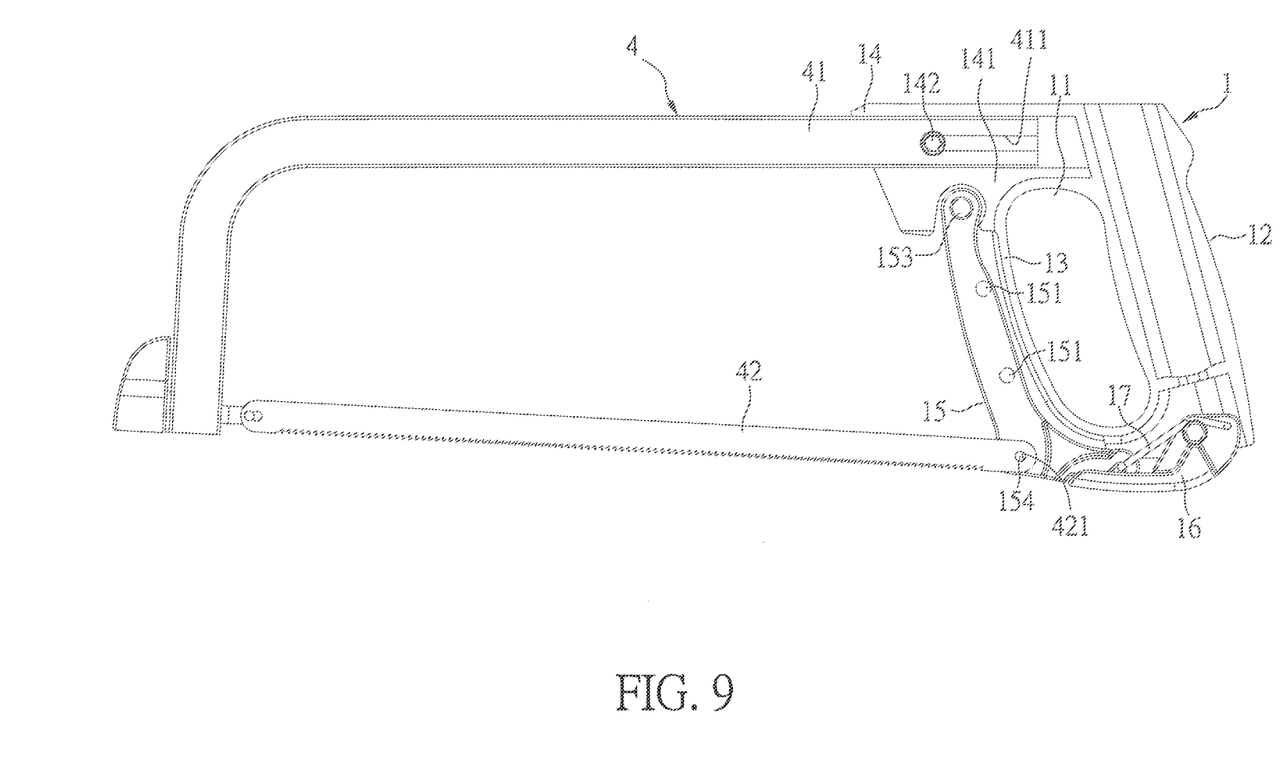
FIG. 9 illustrates a schematic view showing the assembly is to be assembled with yet another embodiment of a saw member.

As shown in FIG. 8, the saw handle 1 can be not only assembled with the saw member 2, but also a saw member 3. Different from the saw member 2, the saw member 3 comprises two opened holes 32 and two closed holes 33. Therefore, the saw handle 1 can be assembled with the saw member 3 in a manner similar to assemble with the saw member 2. Furthermore, as shown in FIG. 9, the saw handle 1 can be also assembled with a saw member 4. Here, the saw member 4 includes a blade portion 42, which is a line saw, and a fixing bracket 41 assembled with the blade portion 42. A third stopping bar 154 is defined at a proximate end of the swing arm 15, and the proximate end of the swing arm 15 is near to the fixing device. Accordingly, the fixing bracket 41 can be inserted into the inserting groove 141 of the inserting portion 14, wherein the first stopping bar 142 is passed through an opened hole 411 of the fixing bracket 41, and one end of the blade portion 42 is connected to the third stopping bar 154 at a closed hole 421 of the blade portion 42. Therefore, similarly, the saw member 4 can be assembled with the saw handle 1.

As above, saw members with different appearances can be assembled with the saw handle 1. In assembly, firstly the swing arm 15 is moved out of the receiving space 131 laterally so that the saw member can be inserted into the inserting groove 141 of the inserting portion 14. Next, the swing arm 15 is moved back into the receiving space 131 and positioned by the fixing device. Accordingly, the assembly of the saw member and saw handle can be carried out. Conversely, when the saw member is to be detached from the saw handle 1, the aforesaid steps are taken in a reverse order. Consequently, the assembly of the saw member and the saw handle can be performed quickly and conveniently.

Figure 10:
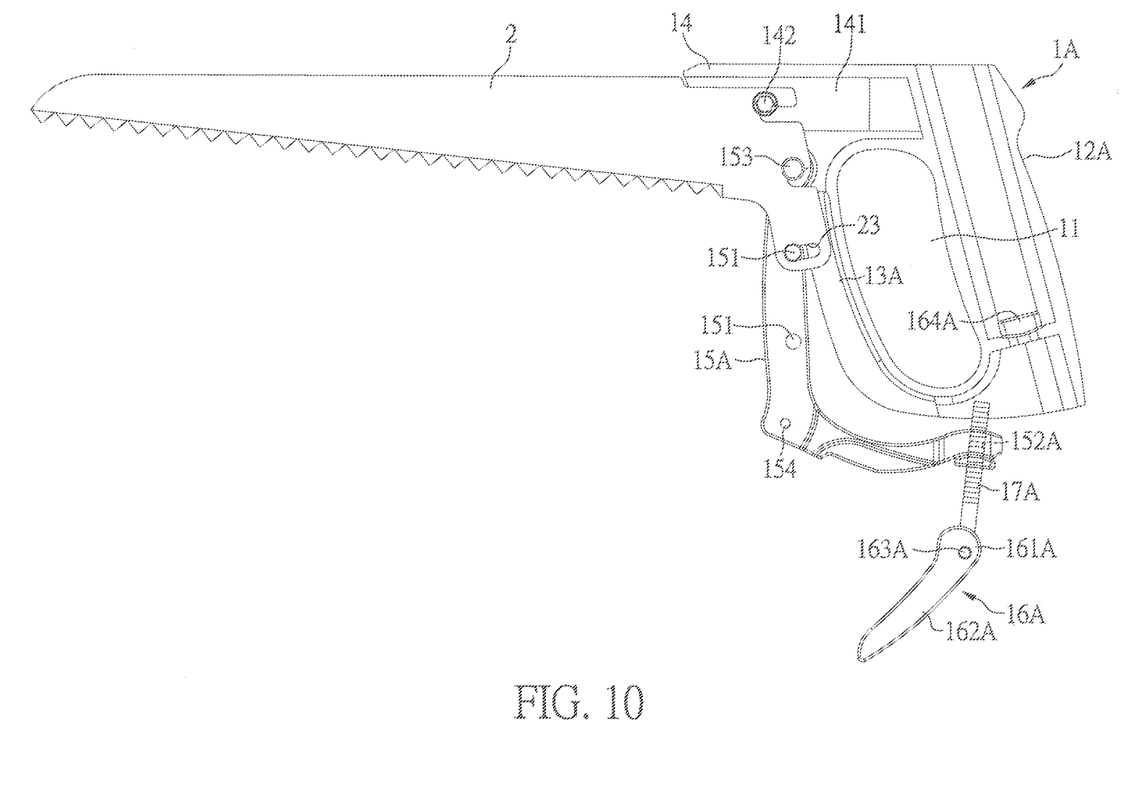
FIG. 10 illustrates a sectional view of an assembly of a saw handle and a saw member according to a second embodiment of the present invention.
Figure 11:
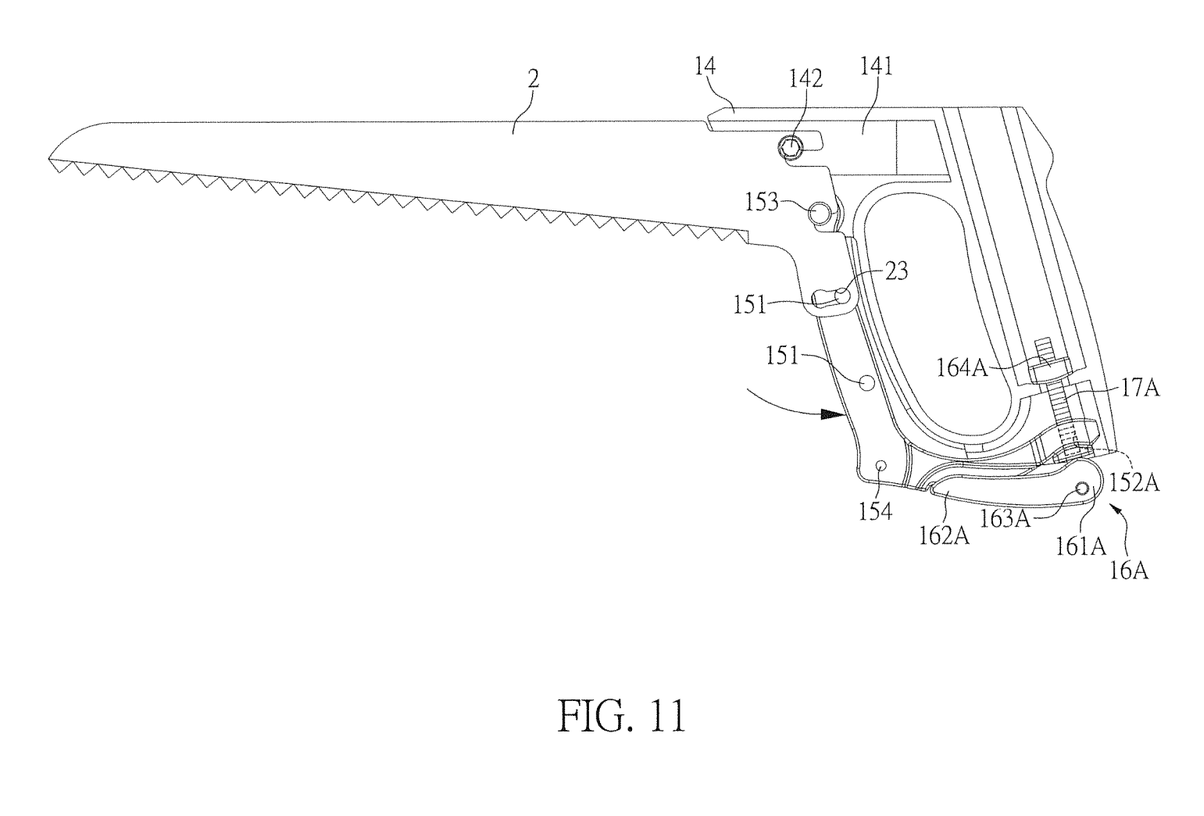
FIG. 11 illustrates a schematic view of the assembly of the second embodiment.

It is understood that the present invention may have exemplary embodiments with small modifications therebetween. Please refer to FIGS. 10 and 11, which illustrate a second embodiment of the present invention. The structure of the second embodiment is approximately the same as that of the first embodiment, except that in the second embodiment, the fixing device includes a controlling member 16A and a bolt 17A. The controlling member 16A has a pivoting portion 161A and a tab portion 162A. The pivoting portion 161A is located at the bottom of the handle portion 12A and pivoted with one end of the bolt 17A by a shaft bar 163A, and the tab portion 162A is exposed from the bottom of the saw handle 1A. A nut 164A is assembled in the handle portion 12A of the saw handle 1A and the nut 164A is provided for locking with the bolt 17A. The swing arm 15A defines a through hole 152A corresponding to the bolt 17A. When the swing arm 15A is received in the receiving space 131 of the guard portion 13A, firstly the through hole 152A of the swing arm 15A is aimed at the nut 164A in the handle portion 12A, and then the bolt 17A passes through the through hole 152A, next the controlling member 16A is driven to lock the bolt 17A with the nut 164A securely, so that the swing arm 15A can be positioned. Accordingly, the fixing device in the second embodiment performs similar function as that in the first embodiment.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An assembly of a saw handle and a saw member, comprising:
   a saw handle having a handle portion and a guard portion spaced from the handle portion, wherein a swing arm is pivotally supported on a portion of the saw handle to swing in a longitudinal plane about a pivot axis that extends in opposite lateral directions, the swing arm and the guard portion are located at the same side of the saw handle, the guard portion is hollowed to define a receiving space, wherein the receiving space opens in the longitudinal plane and receives the swing arm when the swing arm is swung to the receiving space, wherein the saw handle has an inserting portion, the inserting portion has an inserting groove, the inserting groove and the receiving space are located at the same side of the saw handle, the inserting groove communicates with the receiving space, wherein a first stopping bar is passed through the inserting groove of the inserting portion, at least one second stopping bar is assembled on the swing arm, and the at least one second stopping bar is received in the receiving space along with the swing arm, and wherein a fixing device is assembled to the saw handle such that the fixing device releasably fixes the swing arm in the receiving space;
   a saw member having an end portion inserted into the inserting groove, wherein the end portion defines an opened hole and a closed hole, the opened hole is defined at an edge of the saw member and receives the first stopping bar, and a stopping portion is formed in the opened hole, and wherein the position of the closed hole corresponds to the position of one of the at least one second stopping bar;
   wherein, the at least one second stopping bar is movable in the lateral directions between an eject position and a fix position when the swing arm is not received in the receiving space, wherein when the at least one second stopping bar is moved to the eject position, the saw member is not blocked by the at least one second stopping bar and is allowed to be inserted into the inserting groove, and the first stopping bar is stopped by the stopping portion in the opened hole after the saw member is inserted into the inserting groove, and wherein when the at least one second stopping bar is moved to the fix position and the swing arm is received in the receiving space and fixed by the fixing device, the one second stopping bar is passed through the closed hole and abutted against the inner periphery of the closed hole so as to assemble the saw handle with the saw member.

2. The assembly of the saw handle and the saw member according to claim 1, wherein a shaft hole is defined on the inserting portion of the saw handle, the shaft hole is near to the guard portion and the shaft hole comprises a large sized hole portion and a small sized hole portion, the small sized hole portion is located at the inner position with respect to the large sized hole portion and communicates with the inserting groove laterally, wherein one end of the swing arm is pivotally supported by a shaft bar that is disposed in the shaft hole, the shaft bar has a small sized portion that is passed through the small sized hole portion and a large sized portion received in the large sized hole portion, the swing arm is pivoted on the saw handle by the diameter difference between the large sized portion of the shaft bar and the small sized hole portion, wherein the saw handle has a hollowed portion opposite to the shaft bar, and the depth of the large sized hole portion is greater than the length of the large sized portion, wherein when the swing arm is not received in the receiving space, the at least one second stopping bar is adapted to be moved to the eject position, while when the swing arm is received in the receiving space, the at least one second stopping bar is adapted to be moved to the fix position, and wherein when the swing arm is received in the receiving space, the swing arm is blocked by a lateral wall of the receiving space so that the swing arm is limited in the receiving space.

3. The assembly of the saw handle and the saw member according to claim 1, wherein the fixing device includes a controlling member and a buckling member, the controlling member has a pivoting portion assembled at the bottom of the handle portion, and the pivoting portion is pivotally supported with respect to the saw handle by a shaft bar, the controlling member has a tab portion exposed from the bottom of the saw handle, the buckling member is pivoted with respect to an eccentric portion of the controlling member located near to the pivoting portion, the swing arm has a hook portion corresponding to the buckling member, wherein when the swing arm is received in the receiving space, firstly the tab portion is pulled and the buckling portion is buckled with the hook portion, and then the tab portion is moved back, such that the eccentric portion is pivoted with respect to the shaft bar and drives the buckling member to pivot away from the hook portion, thereby the buckling member engages with the hook portion to position the swing arm in the receiving space.

4. The assembly of the saw handle and the saw member according to claim 1, wherein the fixing device includes a controlling member and a bolt, the controlling member has a pivoting portion at the bottom of the handle portion, and the pivoting portion is pivoted with respect to one end of the bolt, the controlling member has a tab portion exposed from the bottom of the saw handle, a nut is assembled in the handle portion of the saw handle and the nut is provided for locking with the bolt, the swing arm defines a through hole corresponding to the bolt, wherein when the swing arm is received in the receiving space, firstly the through hole of the swing arm is aimed at the nut in the handle portion so as to allow the bolt to pass through the through hole, and then the controlling member is driven to lock the bolt with the nut securely, so that the swing arm is positioned.

5. The assembly of the saw handle and the saw member according to claim 1, wherein the opened hole is L-shaped and comprises a linear section and a bent section, the length direction of the linear section is aligned with the inserting direction along which the saw member is inserted into the inserting groove, the length direction of the bent section is tilted from the inserting direction along which the saw member is inserted into the inserting groove, and the stopping portion is formed at the corner between the linear section and the bent section.

6. The assembly of the saw handle and the saw member according to claim 1, wherein a third stopping bar is defined at a proximate end of the swing arm, and the proximate end of the swing arm is near to the fixing device.

7. The assembly of the saw handle and the saw according to claim 1, wherein the closed hole has a large sized hole portion and a small sized hole portion communicating with each other laterally, the at least one second stopping bar has a body portion and a terminal portion, the outer diameter of the terminal portion is greater than the diameter of the small sized hole portion but less than the diameter of the large sized hole portion, and the outer diameter of the body portion is less than the small sized hole portion.

* * * * *